Figure 1:
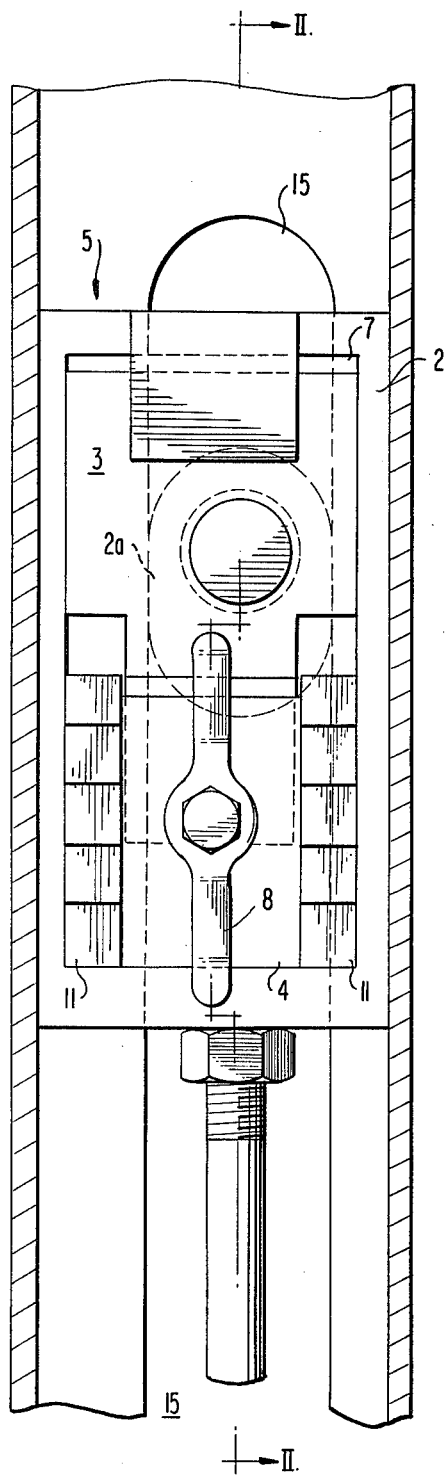

United States Patent [19]

Scholz et al.

[11] 4,135,737

[45] Jan. 23, 1979

[54] ADJUSTABLE UPPER DEFLECTION FITTING FOR A SHOULDER BELT

[75] Inventors: Hansjüergen Scholz, Echterdingen; Walter Jahn, Sindelfingen; Jüergen Gimbel, Gechingen, all of Germany

[73] Assignee: Daimler-Benz Aktiengesellschaft, Germany

[21] Appl. No.: 856,587

[22] Filed: Dec. 1, 1977

[30] Foreign Application Priority Data

Dec. 4, 1976 [DE]  Fed. Rep. of Germany ....... 2655015

[51] Int. Cl.² ............................................. B60R 21/10
[52] U.S. Cl. .................................................. 280/747
[58] Field of Search .................. 280/747, 744, 745; 297/385, 388, 389

[56] References Cited

U.S. PATENT DOCUMENTS

| | | | |
|---|---|---|---|
| 3,964,798 | 6/1966 | Burleigh | 280/744 |
| 4,039,224 | 8/1977 | Bauer et al. | 280/745 |
| 4,040,645 | 8/1977 | Giffen et al. | 280/747 |

FOREIGN PATENT DOCUMENTS 2460092  6/1976  Fed. Rep. of Germany ........... 280/747

Primary Examiner—Robert R. Song
Attorney, Agent, or Firm—Craig & Antonelli

[57] ABSTRACT

A mechanism accommodated in a hollow bearer of a vehicle for adjusting the height of an upper deflection fitting for the shoulder belt of a belt system, which includes a slide member steplessly displaceable in guidances of the vehicle hollow bearer; one hollow bearer wall is thereby provided with at least one row of teeth or recesses into which the coordinated teeth of a detent member connected with a deflecton fitting and guided in a recess of the slide member, engage against the action of at least one spring force retaining the detent member in its normal position during those occurring tensional belt forces which exceed the tensional forces acting on the belt by the belt user during normal driving operation; a gliding member is thereby arranged in the slide member so as to be displaceable in height, whereby the gliding member cooperates with the detent member and displaces the same up to its engagement at least approximately transversely to its direction of movement during correspondingly occurring tensional belt forces.

7 Claims, 2 Drawing Figures

ADJUSTABLE UPPER DEFLECTION FITTING FOR A SHOULDER BELT

The present invention relates to an installation accommodated in a vehicle hollow bearer for the height adjustment of an upper deflection fitting for the shoulder belt of a belt system with a slide member steplessly displaceable in guidances of the vehicle hollow bearer, whereby a hollow bearer wall of the vehicle hollow bearer is provided with at least one row of teeth or recesses, into which the coordinated teeth of a detent member of the installation, which is connected with the deflection fitting and is guided in a recess of the slide member, engages against the action of at least one spring force retaining the detent member in the normal position, during those occurring tensional belt forces which go beyond the tensional forces acting on the belt by the belt user during normal driving operation, as disclosed in the German patent application No. P 26 51 037.2

Installations of the aforementioned type which can be steplessly adjusted in height in dependence on the position of a seat in the vehicle and which enable an adaptation of the upper anchoring point of the safety belt to extreme body sizes, are retained in their respective position exclusively by a transmission installation, for example, by a Bowden cable, connecting the seat with the adjusting mechanism, but are not fixed so that in the abnormal driving operation, for example, during a strong braking or in case of a vehicle impact, an undesired displacement of the mechanism and therewith of the deflection fitting may occur which would signify an increased injury danger to the belt user.

The present invention is concerned with the task to provide an installation which is capable to retain the deflection fitting in its position not only durng normal driving operation but also during strong braking, for example, during full braking, or during a vehicle impact.

It is proposed as an advantageous further development of the measures according to the aforementioned prior German application that a gliding member cooperating with the detent member is arranged displaceable in height within the slide member, which gliding member displaces the detent member transversely or approximately transversely to the direction of movement of the gliding member up to engagement thereof with corresponding occurring tensional belt forces.

In a preferred embodiment of the present invention, the gliding member may be slidingly arranged on the detent member in such a manner that the mutually abutting slide surfaces form an angle of about 45° to the direction of movement of the gliding member.

Provision is made as a further feature of the present invention that a return spring is provided which is supported at the hollow bearer wall and which presses the detent member into the recess of the slide member.

According to the present invention, the gliding member may be securely connected with a fastening means having a shank for the deflection fitting, preferably with a bolt, whereby the shank portion is guided displaceable in height, on the one hand, in an elongated aperture provided in a hollow bearer wall facing the detent mechanism and, on the other, in an elongated aperture arranged in the slide member.

Accordingly, it is an object of the present invention to provide an installation accommodated in a hollow bearer of a vehicle, for the height adjustment of an upper deflection fitting for the shoulder belt of a belt system which avoids by simple means the aforementioned shortcomings and drawbacks encountered in the prior art.

Another object of the present invention resides in a height-adjusting mechanism accommodated in a hollow vehicle bearer for adjusting the height of an upper deflection fitting for the shoulder belt of a belt system which reliably prevents a change in the height position of a deflection fitting even during a strong braking action or during a vehicle collision.

A further object of the present invention resides in a height-adjusting mechanism of the type described above which is simple in construction, utilizes relatively few parts that can be readily manufactured and assembled and is highly reliable in the operation for its intended purposes.

Figure 2:
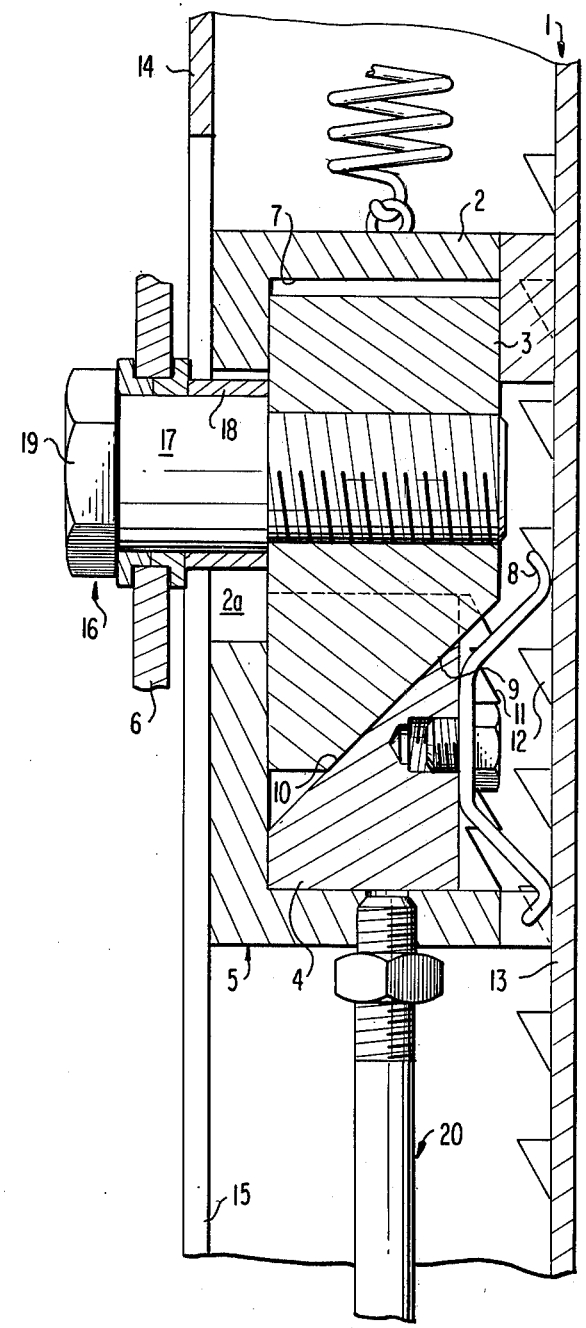

These and other objects, features and advantages of the present invention will become more apparent from the following description when taken in connection with the accompanying drawing which shows, for purposes of illustration only, one embodiment in accordance with the present invention, and wherein:

FIG. 1 is an elevational view of a mechanism displaceable in a vehicle hollow bearer for the height adjustment of an upper deflection fitting in accordance with the present invention; and FIG. 2 is a cross-sectional view of the mechanism in the vehicle hollow bearer taken along line II—II of FIG. 1.

Referring now to the drawing wherein like reference numerals are used throughout the two views to designate like parts, a height-adjusting mechanism generally designated by reference numeral 5 and essentially consisting of a slide member 2, of a gliding member 3 and of a detent member 4 is accommodated according to FIGS. 1 and 2 in the center column formed by a hollow bearer generally designated by reference numeral 1 of a passenger motor vehicle, not illustrated in detail; the mechanism 5 serves for the height adjustment of an upper deflection fitting 6 for the shoulder belt of a belt system.

The slide member 2 is steplessly displaceably arranged in guidances of the hollow bearer 1 and is provided with a large-volume recess 7, in which the gliding member 3 is guided so as to be displaceable in height whereas the detent member 4 is guided in the recess 7 transversely to the direction of movement of the gliding member 3 against the pressure of a return spring 8.

The gliding member 3 abuts with its outwardly disposed slide surfaces 9 on the slide surfaces 10 of the detent member 4 whereby the mutually abutting slide surfaces 9 and 10 form an angle of about 45° to the direction of movement of the gliding member 3 and of the slide member 2.

The detent member 4 is provided according to FIG. 1 with two parallel rows of teeth 11 disposed adjacent one another which are coordinated to the similarly shaped, complementary rows of teeth 12 of the outwardly disposed hollow bearer wall 13 (FIG. 2).

An elongated aperture 15 is provided in the hollow bearer wall 14 disposed opposite the hollow bearer wall 13, while a shorter elongated aperture 2a of the slide member 2 which extends in the same direction as the longer elongated aperture 15, is disposed opposite the elongated aperture 15. A bolt 16 threadably secured to the gliding member 3 extends through both elongated apertures 15 and 2a; the bolt 16 slides up or down with a sleeve 18 surrounding the shank portion 17 of the bolt 16 only in the elongated aperture 15 during a height adjustment of the mechanism and slides downwardly also in the elongated aperture 2a during abnormal belt loads.

The deflection fitting 6 is pivotally supported between the sleeve 18 and the bolt head 19.

For purposes of height adjustment of the deflection fitting 6, the slide member 2 is connected with one of the adjustable front seats (not shown) by way of a transmission installation generally designated by reference numeral 20 which essentially consists of a Bowden cable. If the seat is displaced forwardly out of a predetermined base position, then the slide member 2 is displaced downwardly in the hollow bearer 1. With an adjustment of the seat toward the rear, the slide member 2 and therewith the deflection fitting 6 are displaced upwardly.

If now the belt is abnormally stressed by the belt user, for example, as a result of an excessive braking, then the gliding member 3 is pulled downwardly which in its turn presses onto the detent member 4 in such a manner that the detent member 4 deflects laterally against the force of the return spring 8 and engages with its teeth 11 in the teeth 12 of the hollow bearer wall 13.

As soon as the belt is relieved, the return spring 8 forces the detent member 4 and the gliding member 3 back into their normal position. The mutually oppositely disposed teeth 11, 12 are then again free of contact so that the previously blocked slide member 2 is again freely movable in the hollow bearer 1—in dependence on the seat position.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A mechanism accommodated in a hollow bearer for adjusting the height of an upper deflection fitting for the shoulder belt of a belt system, comprising slide means steplessly displaceable in guide means of the vehicle hollow bearer, first engageable means provided on a hollow bearer wall of the vehicle hollow bearer, detent means operatively connected with the deflection fitting and guided in a recess means of the slide means, said detent means being provided with second engageable means operable to engage in said first engageable means against the action of a spring force retaining the detent means in its normal position during those occurring tensional belt forces which exceed the tensional forces acting on the belt by the belt user during normal driving operation, characterized in that a gliding member cooperating with the detent means is arranged displaceable in height in the slide means, said gliding member displacing the detent means during correspondingly occurring tensional belt forces at least approximately transversely to the movement direction of the gliding member up to engagement of the first and second engageable means.

2. A mechanism according to claim 1, characterized in that the gliding member is slidingly arranged on the detent means in such a manner that the mutually abutting slide surfaces form an angle of about 45° to the direction of movement of the gliding member.

3. A mechanism according to claim 2, characterized in that a return spring means is provided which is supported at the hollow bearer wall and which forces the detent means into the recess means of the slide means.

4. A mechanism according to claim 3, characterized in that the gliding member is securely connected with a fastening means for the deflection fitting, said fastening means having a shank portion which is displaceably guided in height, on the one hand, in an elongated aperture provided in a hollow bearer wall disposed opposite the detent means and on the other, in an elongated aperture provided in the slide means.

5. A mechanism according to claim 1, characterized in that a return spring means is provided which is supported at the hollow bearer wall and which forces the detent means into the recess means of the slide means.

6. A mechanism according to claim 1, characterized in that the gliding member is securely connected with a fastening means for the deflection fitting, said fastening means being displaceably guided in height, on the one hand, in an elongated aperture provided in a hollow bearer wall disposed opposite the detent means and on the other, in an elongated aperture provided in the slide means.

7. A mechanismn according to claim 6, characterized in that a return spring means is provided which is supported at the hollow bearer wall and which forces the detent means into the recess means of the slide means.

* * * * *